(12) United States Patent
Flynn et al.

(10) Patent No.: US 9,714,183 B1
(45) Date of Patent: Jul. 25, 2017

(54) WATER WALLS FOR LIFE SUPPORT

(75) Inventors: Michael T. Flynn, Corte Madera, CA (US); Sherwin J. Gormly, Carson City, NV (US); Mona Hammoudeh, Alameda, CA (US); Tra-My Justine Richardson, Mountain View, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 808 days.

(21) Appl. No.: 13/535,884

(22) Filed: Jun. 28, 2012

Related U.S. Application Data

(60) Provisional application No. 61/502,222, filed on Jun. 28, 2011.

(51) Int. Cl.
| | |
|---|---|
| *B01D 61/00* | (2006.01) |
| *B01D 11/00* | (2006.01) |
| *C02F 1/44* | (2006.01) |
| *B01D 61/24* | (2006.01) |
| *C02F 9/00* | (2006.01) |

(52) U.S. Cl.
CPC .............. *C02F 9/00* (2013.01); *C02F 1/445* (2013.01); *C02F 1/441* (2013.01); *C02F 2303/04* (2013.01)

(58) Field of Classification Search
CPC ..... B01D 61/002; B01D 61/025; C02F 1/441; Y02W 10/30
See application file for complete search history.

(56) References Cited

U.S. PATENT DOCUMENTS

| | | | |
|---|---|---|---|
| 3,702,820 A * | 11/1972 | Hough | 426/392 |
| 4,177,146 A * | 12/1979 | Popper et al. | 210/137 |
| 4,299,066 A | 11/1981 | Thompson | |
| 4,920,105 A * | 4/1990 | Zelman | 514/59 |
| 5,058,330 A | 10/1991 | Chow | |
| 5,098,575 A * | 3/1992 | Yaeli | 210/652 |
| 5,382,365 A * | 1/1995 | Deblay | 210/644 |
| 6,874,434 B1 | 4/2005 | Bigelow et al. | |
| 7,445,712 B2 | 11/2008 | Herron | |
| 7,727,400 B2 * | 6/2010 | Flynn | 210/652 |
| 7,914,680 B2 | 3/2011 | Cath et al. | |
| 8,753,514 B2 * | 6/2014 | McGinnis | 210/644 |
| 9,039,899 B2 * | 5/2015 | McGinnis | 210/637 |
| 2007/0278153 A1 | 12/2007 | Oriard et al. | |
| 2010/0032377 A1 | 2/2010 | Wohlert | |
| 2010/0155329 A1 | 6/2010 | Iyer | |
| 2010/0192575 A1 | 8/2010 | Al-Mayahi et al. | |
| 2010/0213129 A1 * | 8/2010 | Jones et al. | 210/652 |
| 2010/0224476 A1 | 9/2010 | Cath et al. | |
| 2010/0224561 A1 | 9/2010 | Marcin | |

(Continued)

*Primary Examiner* — Ana Fortuna
(74) *Attorney, Agent, or Firm* — John F. Schipper; Robert M. Padilla; Christopher J. Menke

(57) ABSTRACT

A method and associated system for processing waste gases, liquids and solids, produced by human activity, to separate (i) liquids suitable for processing to produce potable water, (ii) solids and liquids suitable for construction of walls suitable for enclosing a habitat volume and for radiation shielding, and (iii) other fluids and solids that are not suitable for processing. A forward osmosis process and a reverse osmosis process are sequentially combined to reduce fouling and to permit accumulation of different processable substances. The invention may be used for long term life support of human activity.

3 Claims, 3 Drawing Sheets

(56) References Cited

U.S. PATENT DOCUMENTS

2011/0081469 A1    4/2011    Herron et al.
2011/0168381 A1    7/2011    Herron et al.
2011/0203994 A1    8/2011    McGinnis et al.
2011/0272355 A1    11/2011    Rajagopalan et al.

\* cited by examiner

WATER WALLS FOR LIFE SUPPORT

This application claims the benefit of U.S. Provisional Application No. 61/502,222, filed Jun. 28, 2011.

ORIGIN OF THE INVENTION

The invention described herein was made in part by an employee of the United States Government and may be manufactured and used by and for the Government of the United States for governmental purposes without the payment of any royalties thereon or therefore.

FIELD OF THE INVENTION

This invention relates to processing of waste fluids (liquids and gases) and waste solids to provide potable water and, at the same time, provide radiation and thermal protection and structural material from which a habitat can be constructed.

BACKGROUND OF THE INVENTION

Most accumulated waste (AW) arising from human activities in space contains a substantial amount of water and/or oxygen and/or other resources that have been "consumed" in the activities. This accumulated waste puts a burden on a life support system in several ways. First, an initial storage system must be provided to store the not-yet-used resources (e.g., water, nutrients, oxygen for breathing, construction materials) before the resource is (first) used for life support. Second, after first use or any subsequent use, the expended resource must be stored in a separate facility until the project is completed and the waste can be disposed of. Third, the resource and the humans participating in the project must be protected against exposure to radiation, temperature extremes, oxygen deficit, chemical reactions and other undesirable conditions that may contribute to degradation of the resource and/or the human participants.

Much of this waste can be reprocessed and be reused to support the project and/or the human participants, to provide a structure with expandable habitat volume that can be used to house and protect the project and/or the human participants.

In a dry form, some of the residual material (e.g., human waste, including urine and feces) is similar to gypsum wall board and might be sanitized and used for construction of human habitats in regions where conventional construction materials are not available. In a wet form, this residual material may contain 95-99 percent liquid, including but not limited to water, and is potentially useful for radiation shielding.

What is needed is an approach to reprocessing that (i) can separate some construction-useful solid materials from the remainder, (ii) can separate a first portion of the liquid for use as radiation shielding, (iii) can separate and reprocess a second portion of the fluid as potable water for re-use, and (iv) can minimize the volume needed for storage of accumulated waste that cannot be reprocessed and re-used.

SUMMARY OF THE INVENTION

The invention meets many of these needs, by applying fluid-permeable and non-permeable membranes and by separating selected portions of the solid and fluid auxiliary waste (AW) for use as construction and radiation shielding materials and for similar purposes. In one embodiment, the AW is initially received in a bag or container, preferably expandable, with a surface having at least one semi-permeable membrane that supports forward osmosis (FO) when a fluid on a first side of a membrane and a fluid on a second side of the membrane have substantially different osmotic pressure values. A portion PF of the fluid in the bag interior, but not the solute or solids in the bag interior, passes across the membrane into the bag exterior by FO action. The portion PF is either processed directly or is received by a mechanism, such as a reverse osmosis (RO) pump, which is connected to a membrane element that serves to filter and pass low solute liquid LSL (mostly water) through the membrane element to an exit and to catch, hold and permit recycling of the remaining concentrated by-product fluids, which may contain substantial amounts of solute. The LSL is subsequently processed to convert a substantial portion to potable water and other useful liquids.

FO is a natural process where the osmotic potential between two fluids of differing solute/solvent concentrations equalize by movement of solvent from the less concentrated solution to the more concentrated solution. Typically, this is accomplished through use of a semi-permeable membrane that initially separates the two solutions, and allows the solvent, but not the solute, to pass through the membrane pores. This flux of solvent across the membrane continues until the osmotic potential across the membrane and solute/solvent concentrations are approximately equalized.

When an FO element is exhausted, fouls out, and/or is stalled by presence of excessive waste side residuals, treatment ceases in that element, and the treatment element function is then passed to the next FO bag in the wall. Exhausted FO bag elements are drained, fluids are mixed with feces, solid organic wastes, and/or advanced water treatment residuals, and are re-injected for sludge treatment, or simply cured in place to provide a stable solid. The water wall (WW) FO bags or tanks are consumables, with predictable use intervals, so that time intervals for performance of specified functions during a given mission can be estimated.

Water provides excellent protection from space radiation. It is likely that any future long duration human missions will require radiation shielding, and the use of water will be one of the leading candidates for such shielding. For instance, for a Mars transit mission a 30 cm thick water wall increases the allowable mission duration by 20 percent, based on maintaining total exposure below allowable exposure limits (50 cSv). Water is also crucial to providing life support functions and thermal control. By combining these functions, multiple requirements can be met and a significant mass savings can be achieved. The WW radiation shielding activity is non-parasitic; this protection provides passive mass for radiation protection, in addition to providing at least one other positive function.

In its simplest form, a water wall (WW) provides radiation protection by simultaneously separate potable water and wastewater. This would provide mass savings by eliminating the need for a separate set of water tanks and the water to fill them, assuming that a water wall is also used for radiation protection. For a one-year mission, the water mass required to meet metabolic and hygiene requirements would exceed 100,000 kg/person in an open loop worst-case scenario. We estimate that the $H_2O$ needed for a WW system for a deep space mission is approximately 20 tons. This mass is about 20 percent of the current requirement to support a six-person crew on the International Space Station for a ten-year life. Effluent produced by one bag becomes an input for another bag or Proton Exchange Medium PEM cell.

In addition to mass and radiation savings, water can be recycled in a water wall by integrating membrane-based water treatment systems. Similarly, it is possible to provide air treatment, solid waste treatment, and humidity and thermal control within the water wall. This approach allows life support functions to be removed from the usable habitat volume and placed within the walls, potentially eliminating a sizable portion of the mass, volume, and power consumption of traditional stand-alone systems. This provides a mechanism to recover and reuse water treatment residuals (mostly solids) to strengthen the habitat shell. Furthermore, this approach potentially result in a more passive, and therefore more reliable, system than the current state-of-the-art, which is mechanically complex. It is referred to herein as a Water Protection with Overall System Integration Towards Inside Vehicle Envelopes project.

Influent delivered to an FO membrane often has low ionic strength and a relatively high concentration of large organic molecules that can cause fouling. A permeate that issues from the downstream side of an FO membrane often has high ionic strength and a much lower concentration of the organic molecules.

Air revitalization provides $CO_2$ removal and $O_2$ replenishment. Graywater processing treats urine and other waste water to produce potable water. Blackwater processing treats human solid waste to produce fertilizer and alkaline carbonates (e.g., $CaCO_3$ and/or $MgCO_3$) to produce a gypsum that may be used as a building material. Algae growth sequesters $CO_2$ and produces clean, potable nutritional supplements. The humidity and thermal control process also produces clean, potable water.

The system provides reprocessed air, potable water, thermal protection radiation protection and structural material for construction of a habitat for explorers and/or equipment.

Water Walls is a mostly passive system, using only valves and small pumps as active elements. No compressors, evaporators, sublimators, distillers, absorbers or desorbers are used. WW modules are designed so that their component capacities are consumed gradually throughout the mission. As one unit of a component is used up, the next unit in line is activated and continues the processing. Components in the WW system are renewed by replacing the disposable FO bags and/or membranes. Exhausted FO bag elements can be reused for another life support function, the bags are drained, fluids are mixed with feces, solid organic wastes and advanced water treatment residuals are re-injected for sludge treatment, or cured in place to produce a stable solid.

An interplanetary spacecraft would launch with its WW bags dry. When the space vehicle moves into a low Earth orbit (LEO) or arrives at an Earth-Moon Lagrange point, the bags are primed with water and begin processing the various chemicals and residuals.

Different mission types, mission durations and mission crews will require different life support economies. Preferably, each mission scenario will amply compensate for the possibility of reliability, risk and fluctuation in consumables, for example through provision of buffer capacities.

DESCRIPTION OF THE INVENTION

Figure 1:
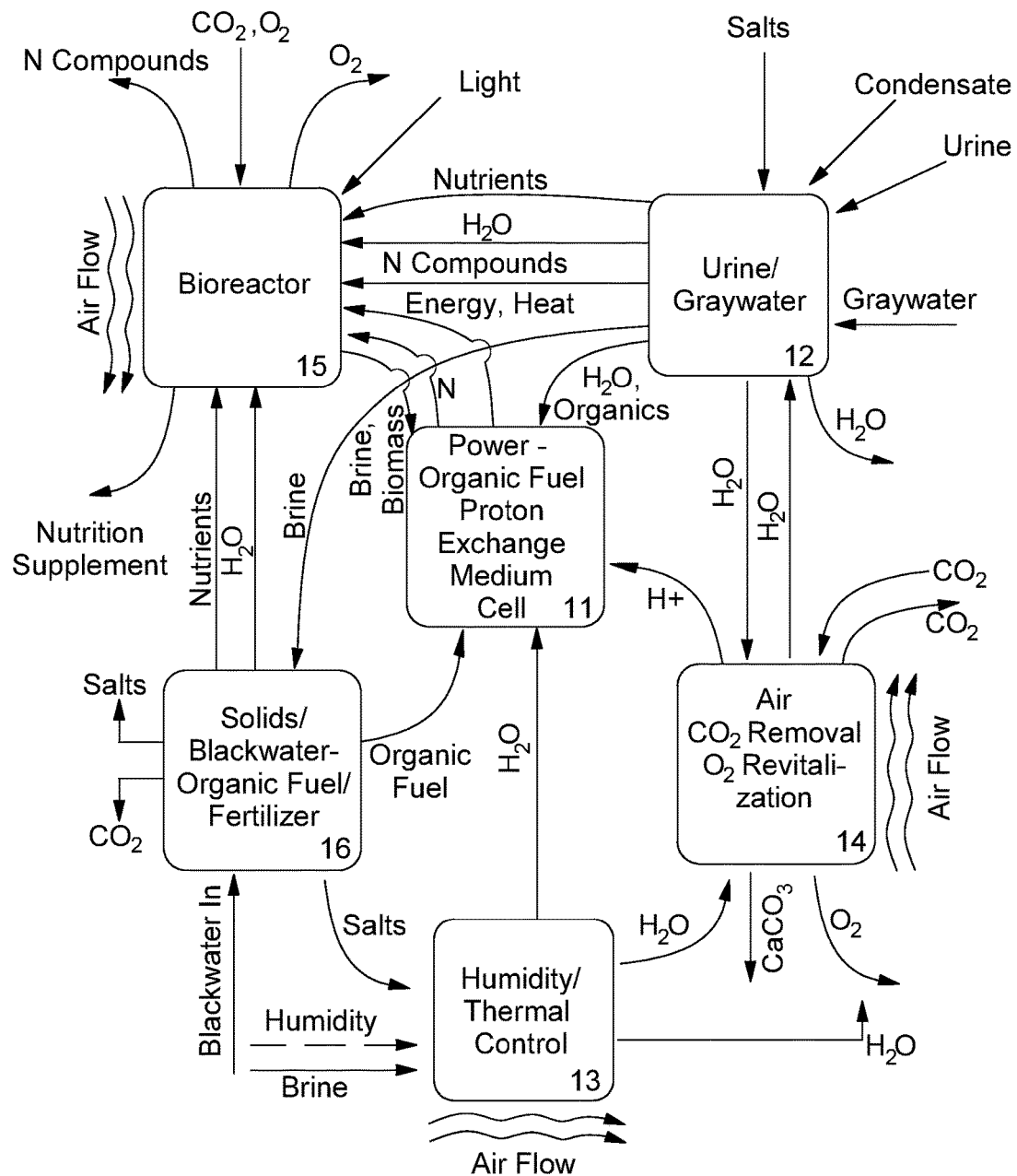
FIG. 1 is a functional flow diagram of generation and transfer of different substances processed by a water walls system.

The invention comprises an assembly of membrane bags, initially packed as dry elements integrated into an inflatable or ridged habitat structure wall. After launch and deployment, the wall is initially filled with water and is maintained as a freshwater supply, thermal control mechanism and radiation shield. As the initial water supply is consumed, some of the depleted treatment bags are filled with wastewater and take on a dual role of active forward osmosis (FO) water treatment and water wall radiation shielding.

When an FO element is exhausted or fouled, or stalled by presence of excessive waste side residuals, treatment ceases in that element, and the treatment element function is passed to the next bag in a sequence in the wall.

Exhausted FO bag elements are drained, fluids are then mixed with feces, solid organic wastes, and/or advanced water treatment residuals, and are re-injected for sludge treatment, or simply cured in place to a stable solid. Exhausted bags now work as organic/solids composting digesters/driers. Anaerobic digestion will produce $CO_2$ and $CH_4$, which will be harvested, compressed and processed for use in $O_2$ generation. Methanogenic composting will stabilize the bio-solids, producing humus. The bio-solids will then be dried using low-pressure ventilation of the bio-solids.

Nitrogen-rich, urine-dominated brines, typical of a transit mission waste profile, are combined with thermally stabilized solids (charcoal and/or ash) and are aerobically treated to drive off ammonia and odor causing VOCs, to be dried to a "sheet-rock" like material in place, similar to gypsum. Once the humus or urine salts (sheet rock) are biologically stabilized, the bags become a permanent hydrocarbon/hydrated precipitate radiation shield and part of a habitat structure.

Air treatment in a spacecraft traditionally includes the functions of thermal control, humidity control, $CO_2$ control, and trace contaminates control. All of these functions can be accomplished to some extent by contacting cabin air with a water wall element constructed with a gas permeable membrane. This water wall element would be separate from the water/solids treatment wall element described previously.

Humidity control is commonly accomplished in a spacecraft by the use of a condensing heat exchanger. A condensing heat exchanger operates by reducing the dew point of a gas such that water vapor condenses out of it and the resulting gas achieves a targeted relative humidity value as the gas leaves the exchanger. Membrane-based condensers can be used as condensing heat exchangers. These membrane condensers can be adapted to use the osmotic potential of salt water across a hydrophilic membrane to cause water vapor to condense.

The approach used in the WW is driven by a combination of thermal and osmotic differences. Osmotic pressure differences are used to control latent energy and to condense water out of the atmosphere, while thermal control is used to control sensible energy and to maintain the cabin air at a specific temperature. In this process, water on one side of a membrane is maintained at a specified temperature, and the osmotic potential is adjusted to condense water out of the air, which is in contact with the other side of the membrane. The liquid water is then treated in a desalination system, which is returned to the water wall at the appropriate temperature and osmotic potential to repeat the process in a continuous cycle. The water removed in the desalination system is then processed to potable water standards.

Carbon dioxide is sparingly soluble in water. However, once solubilized, $CO_2$ can either be converted to carbonic acid (depending on the solution pH), adsorbed by liquid amines, by other liquid or by particulate adsorbent materials in solution, or consumed by organisms and converted to oxygen and biomass through photosynthesis or alkaline carbonate formation and other mineral or organic endpoints. Thus, a water/membrane gas contactor can be used to strip $CO_2$ from cabin air as long as the carbonate ions are removed at a rate in proportion to the solubility restricted diffusion rate of $CO_2$; this may require some pH control. The key to such a process is to provide enough gas/liquid contact area to compensate for the low solubility and diffusion limits of $CO_2$ in water. The WW membrane provides an ideal construction for such an interface, because the inside surface area of the habitat is quite large.

Levels of semi-volatile compounds in a spacecraft atmosphere can be controlled by contacting the atmosphere with liquid water. In such a construct, the maximum level of a given semi-volatile compound in the atmosphere can be calculated using the Henry's Law constant associated with the compound. If the liquid concentration of the compound is kept low, by processing the compound through a bioreactor, catalytic reactor or adsorbent bed, this non-equilibrium between the liquid phase and the gas phase will strip semi-volatile organics from the atmosphere. Some semi-volatiles with boiling points below that of water will not be completely removed so that a secondary biological or physical chemical system may be required.

Removal or volatile organic carbon (VOC) may be accomplished by photo-catalysis. The inner liner of the inflatable habitat will be made of a woven silk material impregnated with titanium dioxide. Titanium dioxide is a photo-catalyst when illuminated by ultraviolet (UV) light, and when doped with nitrogen ions or tungsten trioxide $TiO_2$ is also a visible light photo-catalyst. The inner walls of the habitat provide enough surface area to treat most volatile organics, even if conversion rates are low. The light source is the interior lighting of the habitat. The impact of day/night illumination on atmospheric VOC concentrations will have to be evaluated and there may be a need for supplemental biological or physical chemical VOC removal capability.

FIG. 1 is a functional flow diagram illustrating generation and transfer of different substances processed by a water walls system. A first module 11 provides power, using a proton exchange medium (PEM) cell and receives clean water ($H_2O$) from a graywater/urine (GW/U) processing module 12 and from a humidity and thermal control (H/TC) module 13, and receives clean water and protons from an air revitalization (AR) module 14. The proton exchange medium (PEM) cell 11 can use organic material, including waste, effluent and other residuals to generate electrical power. Some systems utilize a two-stage electrochemical process that first electrolyzes organics and water to supply $H_2$ and $O_2$ (stage 1). In stage 2, the $O_2$ supplies oxygen for the crew, and the $H_2$ is used to produce fuel, such as $CH_4$.

The power module (PEM) 11 produces $N_2$ as an output, which is received by an algae growth module 15. The algae growth (AG) module also receives $N_2$ and clean water from the graywater/urine (GW/U) module 12, receives clean water, fertilizer and ammonium brine from the blackwater/solids (BW/S) module 16, and receives light or electromagnetic energy from an ambient light source. The algae growth (AG) module 15 produces $N_2$, $CO_2$ and $O_2$ as outputs. The graywater/urine (GW/U) module 12 receives (non-clean) water from the air revitalization (AR) module 14 and $NH_3$ brine from the blackwater/solids (BW/S) module 16 and condensate from other sources, and produces clean water, which is received by the algae growth (AG) module 15 and by the air revitalization (AR) module 14. The air revitalization module 14 receives clean water from the graywater/urine module 12 and from the humidity/thermal control module 13, receives $CO_2$ and (alkaline) $CO_3$ or another carbonate from other sources, and produces $O_2$ and (non-clean) water as outputs. The humidity/thermal control module 13 receives humid air as an input from human activity and produces clean water as an output. The blackwater/solids (BW/S) module 16 receives blackwater, solids, and ammonium brine as inputs and produces (non-clean) water and fertilizer as outputs. Table 1 sets forth the inputs and outputs for each of the six modules. Here, "HA" in Table 1 refers to a module input that arises primarily from human activity.

TABLE 1

Module Inputs and Outputs.

| | Inputs. | Outputs. |
| --- | --- | --- |
| PEM Cell | Clean $H_2O$ (GW/U, H/TC) $H_2O$ w. protons Organic fuel (BW/S) | $N_2$ (AG) |
| Algae Growth | $N_2$ (PEM, GW/U) $CO_2$ (AR) Light (ambient) Fertilizer (BW/S) $H_2O$ (BW/S) Clean H2O (GW/U) | $N_2$ $O_2$ nutrition suppl. $NH_3$ brine (BW/S) |
| Blackwater/Solids | Black water (HA) $NH_3$ brine (AG) Salts (HA) | Organic fuel (PEM) H2O (AG) Fertilizer (AG) |
| Humidity/Thermal Control | Humid air | clean $H_2O$ (AR, PEM) |
| Air Revitalization (AR) | Clean $H_2O$ (GW/U, H/TC) $CO_2$ (AR) | (Alk)$CO_3$ $O_2$ $H_2O$ (GW/U) $H_2O$ w. protons |
| Graywater/Urine | Gray water (HA) Urine (HA) Condensate (HA) $H_2O$ (AR) | Clean $H_2O$ (AR, AG) $N_2$ (AG) NH3 brine (BW/S) |

The functional flow diagram of FIG. 1: (1) identifies the feed stock(s) for a given FO bag (clean water, non-clean water, salts, nitrates, $CO_2$, solids, etc.); (2) identifies the bags or processes that require air flow and/or light; (3) identifies the waste products that are subsequently processed by the WW system; (4) assigns the process flow outputs; and (5) allows estimation of the number and size of each type of FO bags and PEM cells needed for various mission scenarios.

A proton exchange medium (PEM) cell can use organic material, including waste, effluent and other residuals to generate electrical power. Some systems utilize a two-stage electrochemical process that first electrolyzes organics and water to supply $H_2$ and $O_2$ (stage 1). In stage 2, the $O_2$ supplies oxygen for the crew, and the $H_2$ is used to produce fuel, such as $CH_4$.

Table 2 illustrates a minimum number of bags with different functionalities that would be needed for one embodiment for estimated proportional sizing. The bags do not have uniform volume outputs, and a particular output of a bag may be allocated as an input for more than one bag having a different functionality.

TABLE 2

Sizing of Water Wall Bags and Cells.

| Type of bag. | No. of bags or cells. |
| --- | --- |
| Algae growth (AG) | 1 |
| Blackwater/solids (BW/S) | 5 |
| Humidity/thermal control (H/TC) | 6 |
| Graywater/urine (GW/U) | 10 |
| Air revitalization (AR) | 20 |
| PEM | 1 |

Figure 2:
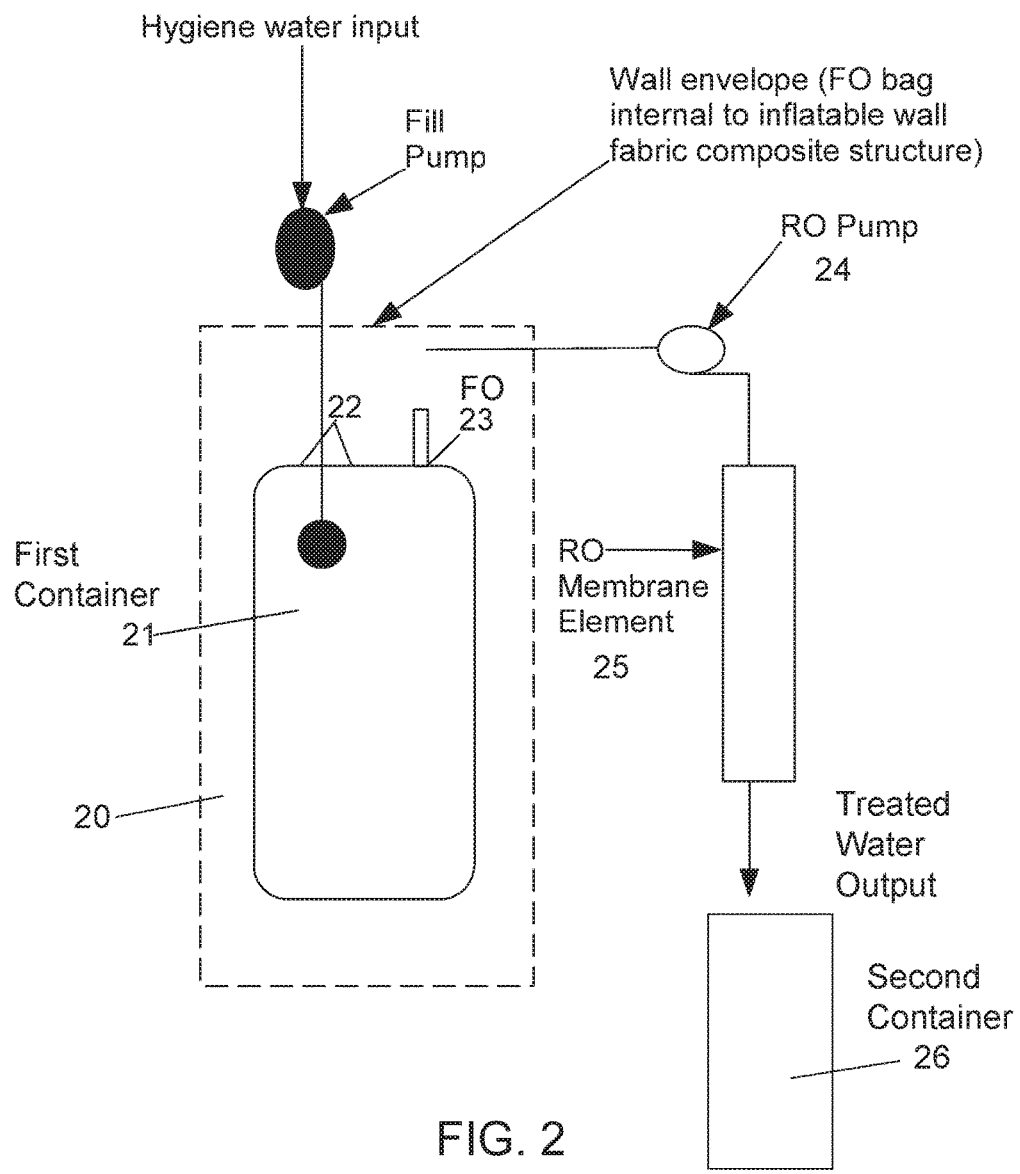
FIG. 2 illustrates a system for practice of an embodiment of the invention.

FIG. 2 illustrates an embodiment of a system for reprocessing a combination of solid wastes, liquid wastes and gas wastes ("accumulated waste" AW) to provide and collect potable water in one zone and to collect and store non-recyclable solid wastes and liquids in another zone. The accumulated waste AW is received in a first container 21, having at least one surface 22 that includes a semi-permeable membrane 23 that supports forward osmosis (FO) action, when fluid (e.g., a mixture of water and other substances) on a first side and fluid on a second side of the membrane initially have a large concentration differential. For example, where the second side of the membrane (downstream direction, third container 20) includes a sports drink or other liquid with a much smaller concentration of water than the water concentration on the first side of the membrane (within the first container 21), FO action will cause fluid on the first side of the membrane to flow across the FO membrane 23 to the second membrane side until a sum of osmotic pressure and hydrostatic pressure on each of the two membrane sides is approximately equalized. The solutes within the first container 21, including waste solids, generally cannot pass through semi-permeable membranes so that most or all of the solutes remain within the first container 21.

When the solute is a salt, a portion of the solvent (initially part of the AW) that passes across the membrane 23 is received by an FO receiving liquid and by a desalinator, such as a reverse osmosis (RO) pump 24, which is connected to an RO membrane element 25 that provides a filtering action, passing low solute liquids LSL and holding or diverting fluids having a higher solute concentration. The LSL is subsequently collected in a second container 26 and is processed to convert a substantial portion to potable water and other useful liquids and gases.

The AW solids and liquids are periodically removed from the container 21, dried or partly de-liquefied, and converted to habitat construction and/or to radiation protection material, for incorporation in one or more habitat walls. This de-liquefied material preferably includes some water and/or other low molecular weight liquids, which can serve as radiation protection material for the habitat structure. The habitat walls are movable and expandable to allow adjustment (e.g., increase) of the enclosed habitat volume used by the human participants and/or for implementing the project.

An alternative approach uses a membrane-encased algae bioreactor segment of the water wall to strip $CO_2$ and convert the substance into $O_2$. Bio-air scrubbing has been used in industrial air pollution control, and more particularly for odor control for some time. Models for trace contaminant control can be constructed based on these industrial air pollution control systems. The technology of gas exchange membranes is well developed and can also be applied. Such a system could be very effective, but would likely require re-supply of nitrogen, because the amount of nitrogen available in the waste model is insufficient to support full $CO_2$ conversion requirements. However, nitrogen is normally lost in the atmosphere due to spacecraft leakage and EVA, and re-supplying nitrogen as a fertilizer may offer benefits to re-supply when compared with tanked high-pressure gas.

Anaerobic digestion will produce $CO_2$ and $CH_4$ gases, which can be harvested, compressed and processed for use in $O_2$ generation. Ammonia and VOCs handling and control may be more flexible, depending on composition of the waste stream. Methanogenic composting will reduce the water content support diversion of this water, and stabilize the bio-solids.

The WW approach supports and allows implementation of water recycling, air scrubbing and treatment, temperature control, humidity control, treatment and re-deployment of solids residuals that cannot be re-used for their original purpose, strengthening of the habitat walls, and provision of radiation shielding.

Water bags may have pervaporation membranes oriented facing inward and can support removal of $CO_2$ and trace organics from the ambient air.

Air treatment in a spacecraft is traditionally includes the functions of thermal control, humidity control, $CO_2$ control, and trace contaminant control. All of these functions can be accomplished to some extent by contacting cabin air with a water wall element constructed as a filter with a gas permeable membrane. The water wall element would be separate from the water/solids treatment wall element described in the preceding.

Humidity control is commonly accomplished in a spacecraft by use of a condensing heat exchanger. A condensing heat exchanger operates by reducing the dew point of a gas so that water vapor condenses out of the gas, and the resulting gas achieves a targeted relative humidity as the gas leaves the exchanger. Membrane-based condensers can be used as condensing heat exchangers. These membrane condensers can be adapted to use the osmotic potential of salt water across a hydrophilic membrane to cause water vapor to condense.

The approach used in the water wall relies on a combination of thermal and osmotic pressure differences. Osmotic pressure differences are used to control latent energy and to condense water out of the atmosphere. Thermal control is used to control sensible energy and to maintain the cabin air within a reasonable temperature range. In this process, water on one side of a membrane is maintained at a specified temperature and the osmotic potential is adjusted to condense water vapor out of the air that is in contact with the other side of the membrane. The liquid (mostly water) is then treated in a desalination system, which is returned to the water wall at the appropriate temperature and osmotic potential to repeat the process in a continuous sequence of cycles. The water removed in the desalination system is then treated to achieve potable water standards.

Volatile organic carbon (VOC) removal may be accomplished by photo-catalysis. The inner liner of the inflatable habitat will be made of a woven silk material impregnated with titanium dioxide. Titanium dioxide is a photo-catalyst under ultraviolet (UV) light; when doped with nitrogen ions or tungsten trioxide $TiO_2$ is also a visible light photo-catalyst. The inner walls of the habitat provide enough surface area to treat most volatile organics even if conversion rates are low. The light source is the interior lighting of the habitat. The impact of day/night illumination on atmospheric VOC concentrations will have to be evaluated and there may be a need for supplemental biological or physical chemical VOC removal capability.

The FO process is adaptable and can be incorporated into the water wall bounding material that is used for inflatable structures. An FO bag would normally be packed as part of a flexible and inflatable habitat structure wall. The FO bag may be initially inflated with sterile saline water and initially maintained as part of a fresh water supply and radiation shield. As the initial water supply is consumed, the treatment bags are filled with waste water and serve a dual purpose, for active FO fluid treatment and for radiation shielding. Several different membrane materials are available to support forward osmosis, including cellulose tri-acetate.

Figure 3:
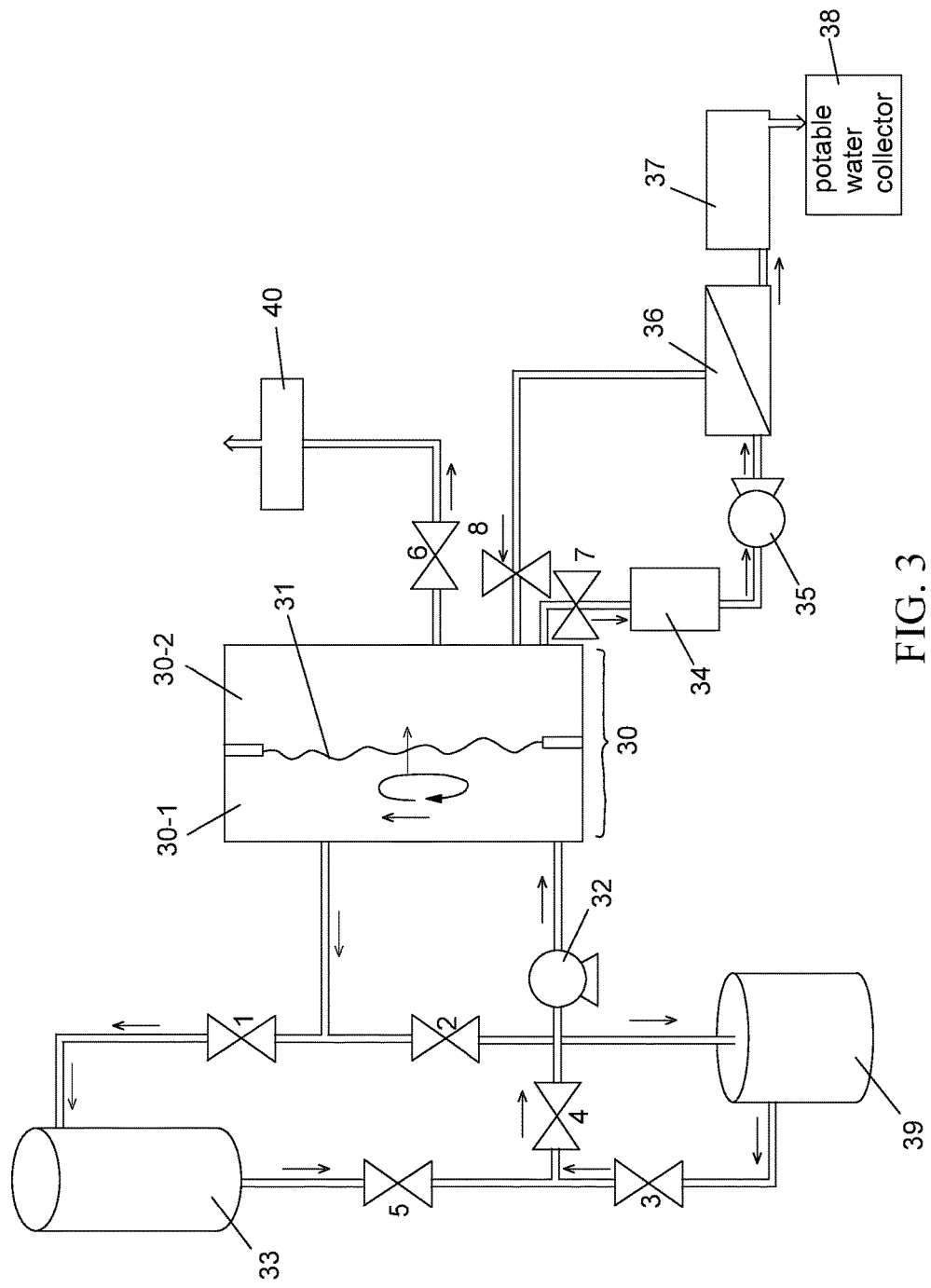
FIG. 3 illustrates a system that may be used to practice several embodiments associated with different processing modes.

FIG. 3 illustrates a system for practicing some embodiments of the invention. An FO bag 30 comprises an upstream region 30-1 and a downstream region, separated by a semi-permeable membrane 31. An FO pump 32 (optional) feeds the upstream region 30-1 of the FO bag. A graywater/blackwater processing tank 33 is connected to the upstream region 30-1 of the FO bag 30 through a first valve 1, a fourth valve 4 and a fifth valve 5. The downstream region 30-2 of the FO bag is connected through an osmotic agent provider 34, through an RO pump 35, through an RO module 36, and preferably through a disinfectant module 37 to a potable water collector 38. A solids processing tank 39 is connected to the graywater/blackwater processing tank 33 through the valves 1 and 2 and is connected to the upstream region 30-1 of the FO bag 30 through a third valve 3, the fourth valve 4 and the FO pump 32. The downstream region 30-2 of the FO bag 30 is connected through a gas vent sixth valve 6 (optional) to a gas vent module 40.

In a first mode of operation, for processing liquid and providing potable water, the valves 1, 4 and 5 are open and the valves 2, 3 and 6 are closed. The upstream region 30-1 of the FO bag 30 receives liquids from the graywater/blackwater processing tank 33 and/or from the solids processing tank 39. The downstream region 30-2 of the FO bag 30 contains a liquid(s) with solute and solvent, having a low osmotic potential (e.g., containing one or more salts, such as $CaCO_3$ or $MgCO_3$ or NaCl, relative to osmotic potential of the anticipated liquids received in the upstream region 30-1. A portion PL of the liquids, mostly water, in the upstream region 30-1 passes through the membrane 31 and into the downstream region 30-2. The liquids PL are received by the RO pump 35 and forcibly passed through the RO module 36 (optionally including an RO membrane), through the disinfectant module 37 (optional) and are collected in the potable water collector 38. Most of the remaining solutes in the liquids PL remain on the upstream side of the RO module 36.

In a second mode of processing, which removes most of the residuals from the upstream region 30-1 associated with the FO bag 30, the valves 1 and 3 are closed and the valves 2, 4 and 5 are open. The remaining liquids in the upstream region 30-1 of the FO bag are circulated through the solids processing tank 37 and/or through the graywater/blackwater processing tank 33 to remove most of the residuals. After removals of most of these residuals, the remaining liquids, including some solutes and solvents, will circulate through the upstream region 30-1 of the FO bag 30 and may produce additional potable water.

In a third mode of processing, to remove further solid waste, the valves 1, 2 and 5 are closed, valves 3 and 4 are open, and valve 6 may be open. The remaining liquids and solutes in the upstream region 30-1, which may be mostly solids, and some gases may be vented through the gas vent valve 6.

In a fourth mode of processing, the valves the valves 3, 4 and 6 are open, valves 1, 2 and 5 are closed and the system acts to digest the solid waste (accumulated in the solids processing tank 39 and to vent the resulting gas produced by waste-digesting micro-organisms through the gas vent valve 6.

What is claimed is:

1. A method for processing waste liquids and waste solids aboard a spacecraft that is participating in space exploration and is subject to radiation in its space exploration activities, the method comprising:
   (i) providing a batch of a waste substance to be processed, comprising at least one of waste liquids and waste solids, in a first container having a semi-permeable first membrane on at least one surface of the first container, where the first membrane is impermeable to solids, does not pass liquids with high solute concentration, and does pass at least one selected liquid, comprising water, by forward osmosis action from the first container to a third container;
   (ii) providing a receiving liquid in the third container, where the at least one selected liquid in the first container has a positive osmotic pressure relative to the receiving liquid in the third container;
   (iii) allowing or causing at least a portion of the at least one selected liquid to move across the first membrane into the receiving liquid to provide, in the third container, a first mixture, comprising at least a portion of the at least one selected liquid and the receiving liquid;
   (iv) providing a reverse osmosis pump and a reverse osmosis membrane, connected together, and a second container;
   (v) allowing or causing at least a portion of the first mixture to be received by and to move through the reverse osmosis pump and, to move through the reverse osmosis membrane, and to be received in the second container, to provide a second mixture, comprising potable water, in the second container;
   (vi) for a time interval between first and second spaced apart times, terminating steps (i)-(v), removing from the first container a third mixture, comprising at least part of the waste solids and waste liquids that remain in the first container after at least a portion of the at least one selected liquid has moved across the first membrane, and applying the third mixture for at least one of habitat construction associated with, and radiation protection for, the spacecraft.

2. The method of claim 1, further comprising partly or fully deliquifying said third mixture before said third mixture is applied for at least one of said habitat construction and said radiation protection.

3. The method of claim 1, further comprising applying a disinfection process to said second mixture that is received by said second container from said reverse osmosis membrane system.

* * * * *